United States Patent

Okunoki et al.

[11] Patent Number: 5,808,682
[45] Date of Patent: Sep. 15, 1998

[54] PICTURE DATA PROCESSING SYSTEM FOR PROCESSING PICTURE DATA REPRESENTING FOREGROUND AND BACKGROUND

[75] Inventors: Yutaka Okunoki; Atsushi Kitahara, both of Tokyo, Japan

[73] Assignee: Sega Enterprises, Ltd., Tokyo, Japan

[21] Appl. No.: 738,777

[22] Filed: Oct. 29, 1996

Related U.S. Application Data

[63] Continuation of Ser. No. 259,249, Jun. 13, 1994, abandoned.

[30] Foreign Application Priority Data

Jun. 14, 1993 [JP] Japan .................................. 5-142250
Jun. 14, 1993 [JP] Japan .................................. 5-142251

[51] Int. Cl.$^6$ ................................................. H04N 7/18
[52] U.S. Cl. .......................... 348/391; 348/391; 348/586; 348/587
[58] Field of Search .................................. 348/586, 587, 348/589, 391, 392, 394, 585

[56] References Cited

U.S. PATENT DOCUMENTS

| | | | |
|---|---|---|---|
| 4,317,114 | 2/1982 | Walker | 340/721 |
| 4,710,806 | 12/1987 | Iwai | 348/590 |
| 4,857,993 | 8/1989 | Music et al. | 348/393 |
| 4,949,165 | 8/1990 | Reimann et al. | 358/10 |
| 5,142,272 | 8/1992 | Kondo | 348/393 |
| 5,155,594 | 10/1992 | Bernstein et al. | 358/136 |
| 5,249,039 | 9/1993 | Chaplin | 348/591 |
| 5,274,453 | 12/1993 | Maeda | 348/586 |
| 5,285,283 | 2/1994 | Fairhurst et al. | 348/590 |
| 5,301,016 | 4/1994 | Gehrmann | 348/586 |
| 5,347,622 | 9/1994 | Takemoto et al. | 348/588 |
| 5,353,063 | 10/1994 | Yagisawa et al. | 348/584 |
| 5,355,225 | 10/1994 | Bachmann et al. | 348/645 |
| 5,381,184 | 1/1995 | Gehrmann | 348/590 |

FOREIGN PATENT DOCUMENTS

| | | |
|---|---|---|
| 62-123834 | 5/1987 | Japan . |
| 3-46468 | 2/1991 | Japan . |
| 4-37276 | 7/1992 | Japan . |

Primary Examiner—Tommy P. Chin
Attorney, Agent, or Firm—Michael N. Meller

[57] ABSTRACT

A moving picture data compressing unit compresses picture data representing a moving picture in which a foreground moves in front of a predetermined background. A header adding unit adds a header to the compressed moving picture data obtained through the moving picture data compression unit, the header comprising a color code indicating the color of the predetermined background. A header removing unit removes the header from the compressed moving picture data and the header removing unit then extracts the color code indicating the color of the predetermined background from the header. A moving picture data expanding unit expands the compressed moving picture data, the header added to this data having been removed by the header removing unit. An identification data generating unit receives the moving picture data expanded by the moving picture data expanding means, compares the moving picture data with the color code extracted from the header removed from the moving picture data by the header removing unit, and generates identification data which indicates whether each pixel represented by the moving picture data is a pixel of the foreground or a pixel of the predetermined background.

24 Claims, 8 Drawing Sheets

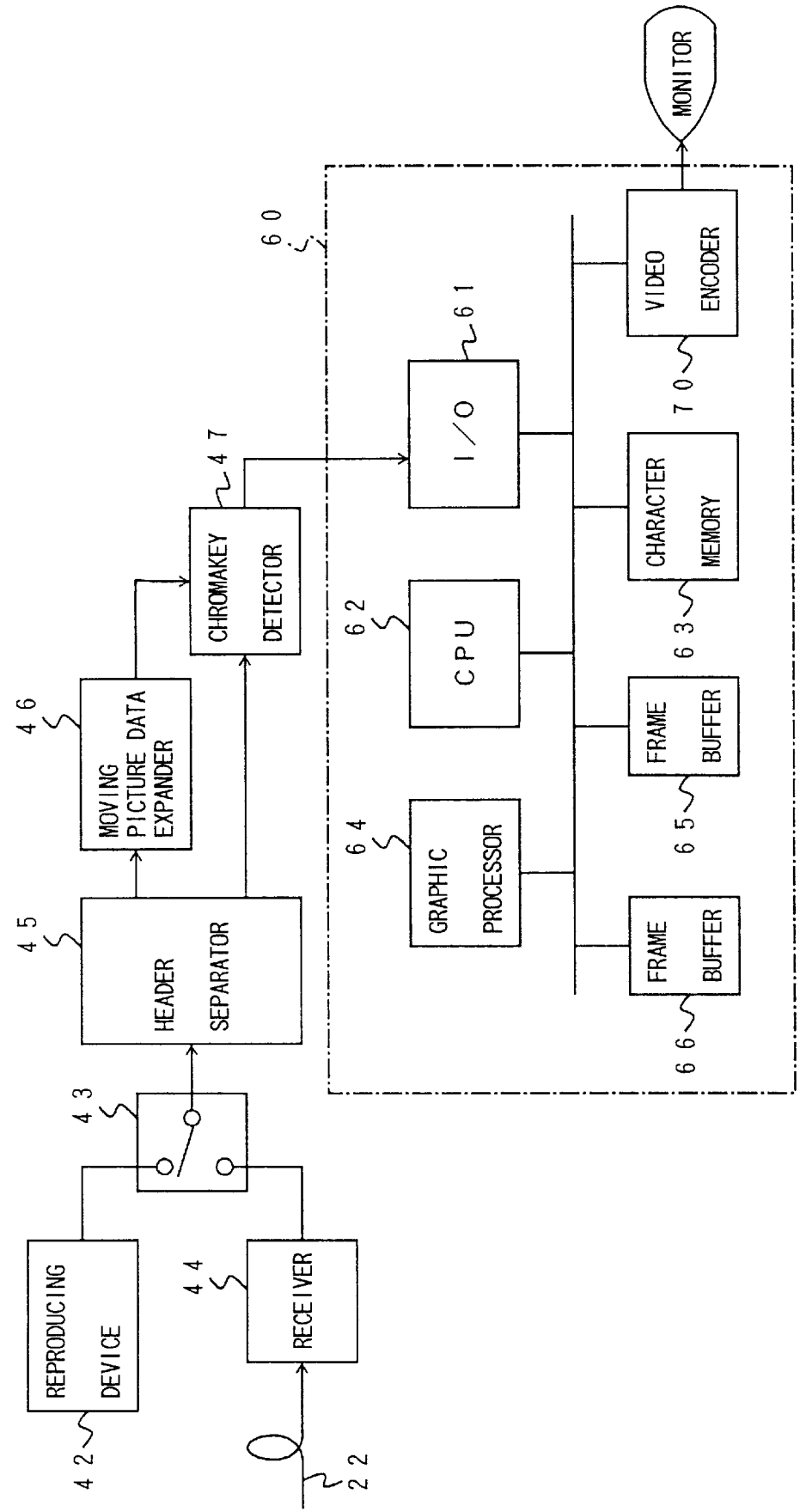

PICTURE DATA PROCESSING SYSTEM FOR PROCESSING PICTURE DATA REPRESENTING FOREGROUND AND BACKGROUND

This application is a continuation of application Ser. No. 08/259,249, filed Jun. 13, 1994, now abandoned.

BACKGROUND OF THE INVENTION

1. Field of the Invention

The present invention relates to a picture data processing system, and in particular, it relates to a moving picture data compression/expansion system for compressing the data representing a moving picture and then transferring or storing the thus compressed data. The system obtains the relevant moving picture by expanding the thus transferred or stored data.

2. Related Art

There are various high-efficiency moving picture data compression technologies such as the moving picture image coding expert group (MPEG) technology, four square transfer (FST) technology and digital video interactive (DVI) technology. Through such technologies, it is possible to store the data representing a moving picture in a recording medium and to reproduce the moving picture in real time as a result of reading the data from the recording medium even if the recording medium is one, such as a compact disc read only memory (CD-ROM), which has a limited storage capacity and a data transfer rate which is relatively low.

In a game apparatus or the like, a game is proceeded so that pictures are displayed, the pictures comprising a desired background picture and a foreground picture, such as the picture of a character or the like, superimposed on the desired background picture. The character is a character (a person, for example) acting in the game.

In such a case, each pixel of the picture data has red, green and blue (RGB) color data and further has priority data, acting as identification data, indicating whether the pixel is a pixel of the foreground picture or a pixel of a certain temporary background. The apparatus displays the foreground picture and the above desired background picture, as the foreground picture is superimposed on the desired background picture. The above certain temporary background is replaced with the desired background picture properly pixel by pixel using the priority data.

The moving picture data compressing technology in the related art such as the MPEG technology can compress moving picture data consisting of the color data but cannot compresses moving picture data including the priority data. As a result, it is not possible to use such moving picture data compressing technology in an operation in which different pictures are displayed so that the pictures are superimposed on each other as described above.

SUMMARY OF THE INVENTION

An object of the present invention is to provide a picture data processing system which has a capability of performing such an operation in which different pictures are displayed so that the pictures are superimposed on each other as described above. The above system performs the above operation using data obtained as a result of expanding once compressed data representing a moving picture. In such a superimposingly displaying operation superimposingly displays the moving picture obtained from the thus expanded data with another picture.

In order to achieve the above object, a picture data processing system according to the present invention comprises color code adding means for adding a color code to picture data representing a foreground and a predetermined temporary background. The color code indicates the color of a predetermined temporary background. Another system according to the present invention comprises color code removing means for removing the color code from the picture data. Another system according to the present invention has the above color code adding means and color code removing means.

The above systems add the color code comprising the predetermined (temporary) background color code to the picture data which may have been previously compressed. The systems further remove the predetermined background color code from the picture data, which may then be expanded. Thus, the systems can produce corresponding identification data which indicates, for each pixel, whether the picture data is data representing the foreground or data representing the predetermined background. The thus produced identification data enables a superimposingly displaying operation, such as that described above, which displays the expanded moving picture (foreground) and the desired background picture so that the moving picture is superimposed on a desired background picture.

Another object of the present invention is to provide a picture data processing system having a capability of compressing/expanding moving picture data including identification data and capability of displaying the expanded moving picture and another picture so that the expanded moving picture is superimposed on the other picture.

In order to achieve the above object, a picture data processing system according to the present invention comprises picture data compressing means for compressing color data of picture data, wherein the picture data comprises the color data combined with identification data. The identification data indicates whether each pixel represented by the moving picture data is a pixel of a foreground or a pixel of a background. The system further comprises identification data compressing means for compressing the identification data. Another system according to the present invention comprises picture data expanding means for expanding the compressed picture data and identification data expanding means for expanding the compressed identification data. Another system according to the present invention comprises the above picture data compressing means, identification data compressing means, picture data expanding means and identification data expanding means.

The above systems may integrate the compressed picture data obtained as a result of compressing the color data with the compressed identification data obtained as a result of compressing the identification data. The system may then separate the integrated data into the compressed picture data and the compressed identification data. The system then expands the thus separated data separately. Thus, compressing/expanding of the picture data and the identification data is made possible. Further, the expanded picture data is combined with the corresponding expanded identification data. Thus, the system can display the relevant picture obtained from the thus expanded picture data and another picture such as a desired background picture. In this displaying, the picture is properly superimposed on the other picture such as a desired background picture using the thus expanded relevant identification data.

Other objects and further features of the present invention will become more apparent from the following detailed description when read in conjunction with the accompanying drawings.

BRIEF DESCRIPTION OF THE DRAWINGS

FIG. 2 shows a block diagram of an expansion system in the first embodiment of a picture data processing system according to the present invention;

DESCRIPTION OF PREFERRED EMBODIMENTS

Figure 1:
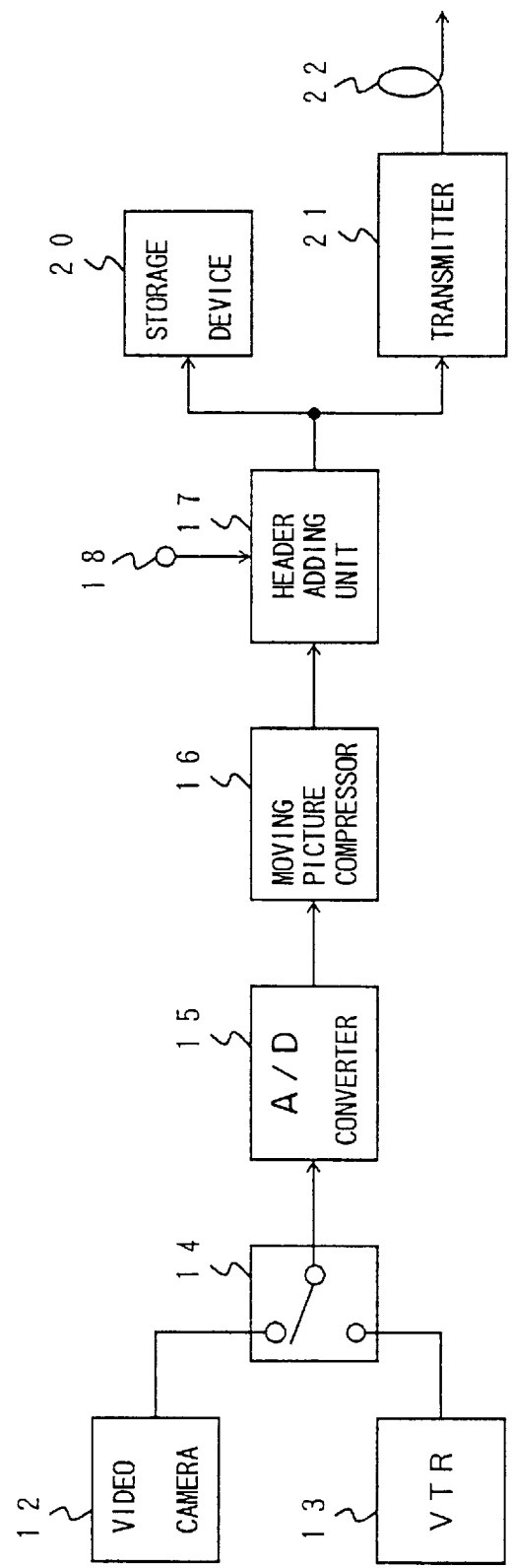
FIG. 1 shows a block diagram of a compression system in a first embodiment of a picture data processing system according to the present invention.
Figure 3A:
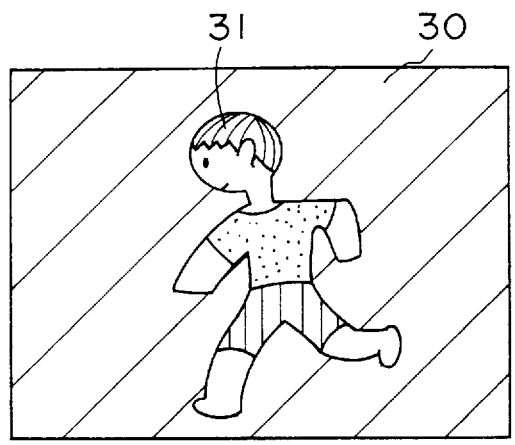
FIG. 3A and 3B illustrate a moving picture consisting of a character picture and a temporary background, and corresponding priority data (priority bits)

A compression system in a first embodiment of a picture data processing system according to the present invention will now be described with reference to FIG. 1. A desired one of a signal representing a moving picture taken by means of a video camera 12 and a signal representing a moving picture reproduced through a video tape recorder 13 is selected through a switch 14. The thus selected signal is supplied to a A/D converter 15. Such a moving picture is a picture (image) such as that in which a foreground 31 moves in front of a background 30 shown in FIG. 3A, for example. The background 30 is formed of a blue screen, for example, and is a temporary one which will be finally replaced by a desired background picture as will be described. A well-known chromakey technology is used to classify picture data into the data representing a temporary background and the data representing a foreground picture which will be used together with the data representing a desired background picture (in a montage manner), as will be described.

The A/D converter 15 separates RGB components from the moving picture video signal and quantizes the signal into a 5-bit digital signal. As a result, picture data is obtained in which each pixel is represented by 15 bits. The picture data is then supplied to a moving picture compressor 16. The moving picture compressor 16 is a MPEG encoder, for example, which with high efficiency compresses the supplied picture data for each 15 frames for example. The thus compressed data is supplied to a header adding unit 17.

Figure 4:
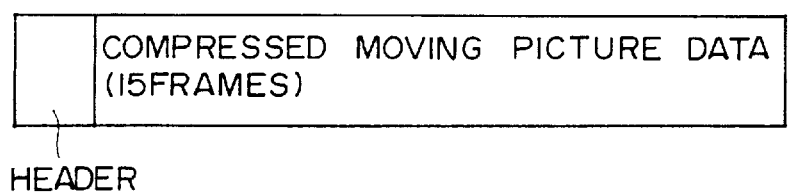
FIG. 4 shows a transfer data format used in the above systems in the first embodiment.

A 15-bit color code specifying the color of the temporary background 30 is supplied to a terminal 18 of the header adding unit 17. The header adding unit 17 adds a header including the 15-bit color code to each 15 frames, for example, of the above compressed data. The 15 frames of the compressed data correspond to a 0.5-second picture displaying time period. Thus, a format of the transmission signal shown in FIG. 4 is obtained. The thus obtained signal is supplied to a storage device 20 such as a CD-ROM, a hard disc device or the like so as to be stored in the corresponding recording medium. The above transmission signal obtained by the header adding unit 17 is also simultaneously supplied to a transmitter 21. The transmitter 21 sends the relevant signal via a communication line 22.

A expansion system in the first embodiment of the picture processing system according to the present invention will now be described with reference to FIG. 2. A reproducing device 42 reproduces the transmission signal from the recording medium, which signal has been stored in the recording medium in the storage device 20. A receiver 44 receives the transmission signal transmitted via the communication line 22. A switch 43 selects a desired one of the transmission signals supplied by the reproducing device 42 and receiver 44. The thus selected data is supplied to a header separator 45 which separates the supplied data, having the format shown in FIG. 4, into the header and the compressed moving picture data. The thus obtained compressed moving picture data is supplied to a moving picture expander 46 which is a MPEG decoder. The header separator 45 extracts the temporary background color code from the above header and supplies the color code to a chromakey detector 47. The above moving picture expander 46 expands the compressed moving picture data and supplies the thus restored (that is, returned to the original state in which the data has not been compressed yet) moving picture data to the chromakey detector 47.

Figure 3B:
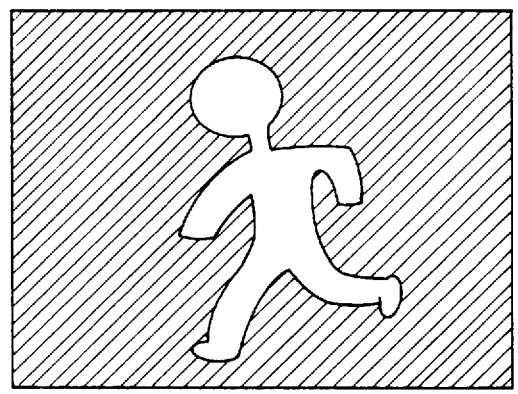

The chromakey detector 47, acting as priority data generating means, compares the moving picture data, for each pixel of the picture represented by the moving picture data, with the temporary background color code. The detector 47 generates a priority bit, acting as identification data, for each pixel, which bit is '0' if the result of the comparison is that the moving picture data corresponds to the temporary background color code and which bit is '1' if the result of the comparison is that the moving picture data does not correspond to the temporary background color code. In the example shown in FIG. 3A, the priority bits illustrated in FIG. 3B are generated. In the FIG. 3B example, the color of the temporary background 30 is blue and the temporary background color code corresponds to blue. In FIG. 3B, the area, corresponding to the temporary background 30, painted by hatching corresponds to the priority bits having the value '0' and the white area shown in the figure, corresponding to the foreground picture 31, corresponds to the priority bits having the value '1'.

The above picture data, output from the picture expander 46, and the priority bits are supplied to a character memory 63 via an input/output unit (I/O) 61. The thus supplied picture data and priority bits are written in an address of the memory 63 for each pixel, the address being specified by a CPU 62. The picture data thus written in the memory 63 for each pixel has a 16-bit formation shown in FIG. 5. The least significant 5 bits, D0 through D4, represent a brightness level of red, the subsequent 5 bits, D5 through D9, represent a brightness level of green, and the subsequent 5 bits, D10 through D14, represent a brightness level of blue. The most significant bit, D15, is the above priority bit.

A graphic processor 64 reads out the above picture data stored in the character memory 63 and performs an arbitrary picture manipulation process on the picture data. The picture manipulation process is a process such as a picture magnification, manipulation, rotation, color operation and so forth. The processor 64 writes the thus processed picture data, combined with the priority bits, in a frame buffer 65. Further, the graphic processor 64 reads the image data and the combined priority bits from the frame buffer 65 and simultaneously, reads data representing a desired background picture from another frame buffer 66. In the reading of the data from the two frame buffers 65 and 66, the processor 64 establishes the vertical and horizontal synchronization between the data reading from the two frame buffers. The data representing the desired background picture(s) was previously stored in the frame buffer 66. The desired background picture data consists of RGB data and does not include priority data (priority bits) such as that mentioned above.

Figure 5:
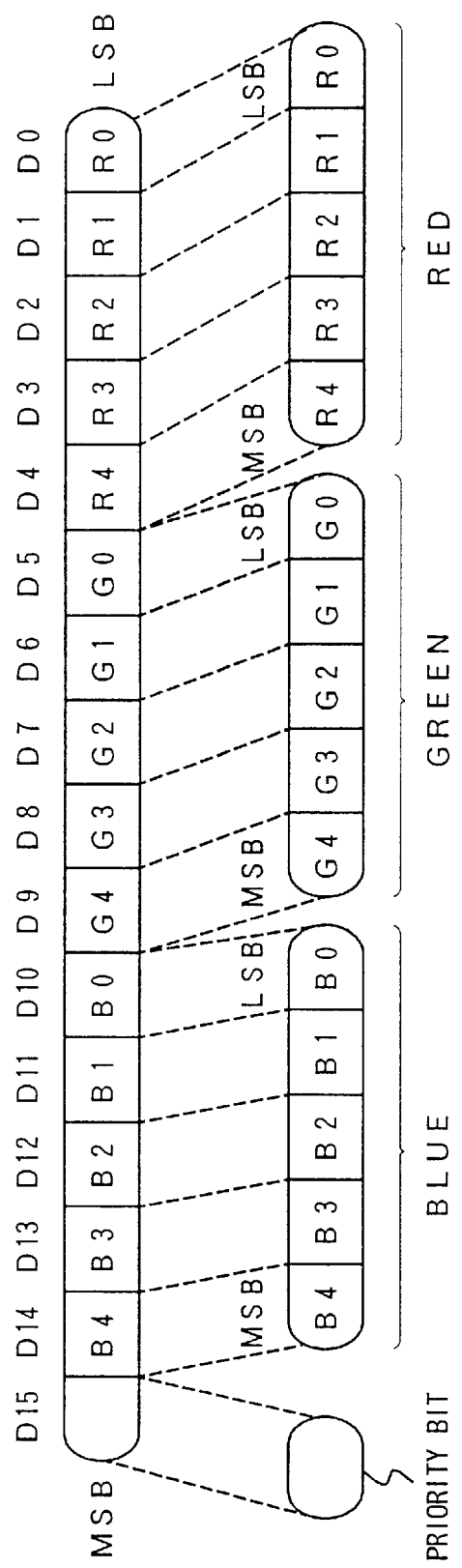
FIG. 5 shows a moving picture data format used in the above systems in the first embodiment and systems which will be described in a second embodiment.

The graphic processor 64 checks the priority bits, combined with the picture data as shown in FIG. 5 and read from the frame buffer 65. The processor 64 selects, for each pixel, the picture data read from the frame buffer 65 if the relevant priority bit is at '1'. The processor 64 selects the picture data (representing the desired background picture) read from the frame buffer 66 if the relevant priority bit is at '0'. Thus, in the example of FIG. 3A and 3B, the picture data supplied from either the reproducing device 42 or the receiver 44 is selected for the pixels corresponding to the foreground 31 and the desired background picture data previously stored in the frame buffer 66 is selected for the pixels corresponding to the temporary background 30. As a result, the currently supplied picture data corresponding to the temporary background 30 is replaced by the area, relevant to the area other than the area occupied by the foreground picture 31, of the desired background picture. The currently supplied picture data corresponding to the foreground 31, as it is, is used. Thus, the foreground picture 31 represented by the currently supplied picture data is properly superimposed on the desired background picture represented by the data previously stored in the frame memory 66.

The graphic processor 64 supplies the picture data selected by the graphic processor 64 as described above to a video encoder 70 which generates the video signal representing the picture in which the foreground picture 31 is superimposed on the desired background picture. The monitor 72 displays the relevant picture using the video signal.

Thus, the compression system transmits the compressed moving picture data to which the header including the temporary background color code has been added. The expansion system extracts the temporary background color code from the header added to the received compressed moving picture data. The expansion system uses the color code so as to generate the priority bits which enable the foreground picture represented by the expanded picture data to be superimposed on another picture such as the previously stored desired background picture.

In the expansion system in the first embodiment, it is possible to superimpose a plurality of moving pictures on one another as follows. After a moving picture is formed in the frame buffer 65, another moving picture is superimposed on the first moving picture.

Thus, the picture processing system according to the present invention has practically effective functions of displaying a moving picture in which a foreground picture, obtained as a result of expanding a once compressed moving picture data, is superimposed on another picture.

Figure 6:
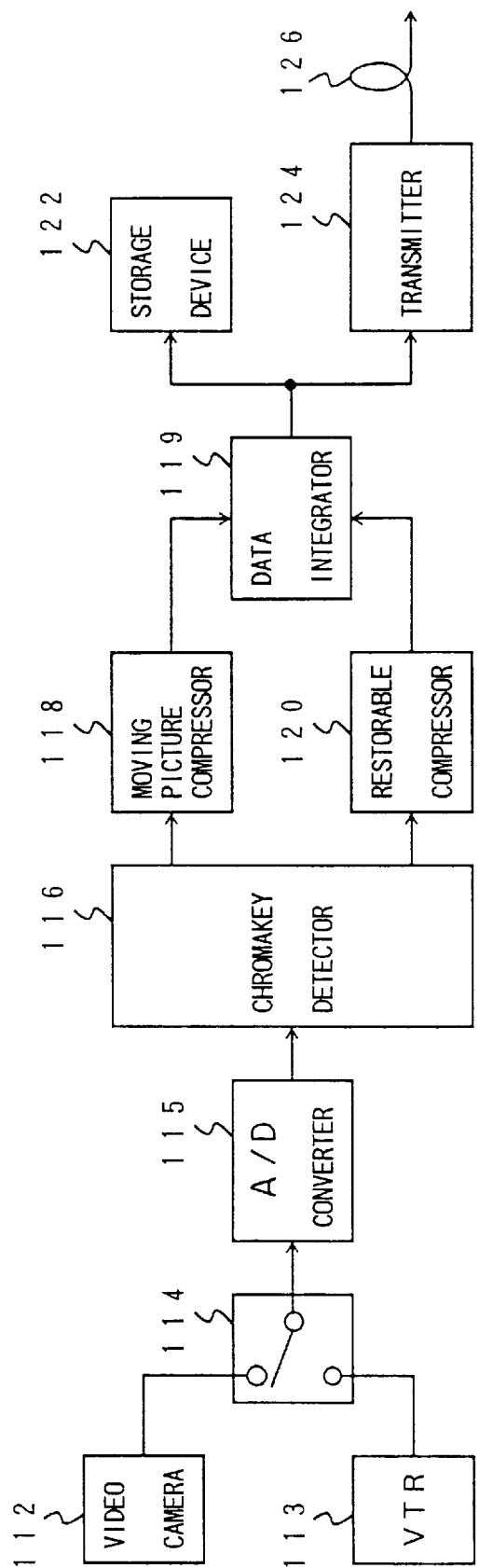
FIG. 6 shows a block diagram of a compression system in the second embodiment of a picture data processing system according to the present invention.
Figure 8A:
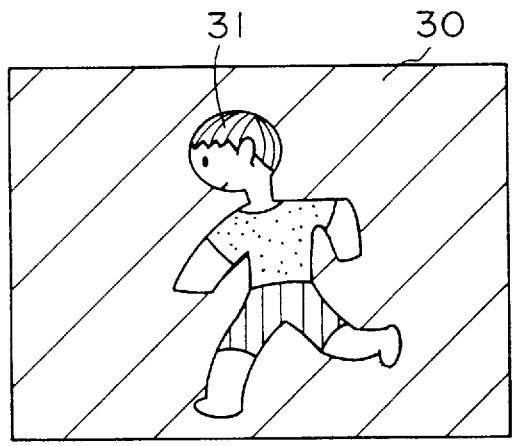
FIG. 8A, 8B and 8C illustrate a moving picture consisting of a character picture and a temporary background, corresponding picture data output from a chromakey detector shown in FIG. 6 and corresponding priority data (priority bits)

A compression system in a second embodiment of a picture data processing system according to the present invention will now be described with reference to FIG. 6. A desired one of a signal representing moving picture taken by means of a video camera 112 and a signal representing a moving picture reproduced through a video tape recorder 113 is selected through a switch 114. The thus selected signal is supplied to a A/D converter 115. Such a moving picture is a picture (image) such as that in which a foreground 31 moves in front of a background 30 as shown in FIG. 8A, for example. The background 30 is formed of a blue screen, for example, and is a temporary background which will be finally replaced by a desired background picture as will be described. A well-known chromakey technology is used to classify picture data into the data representing a temporary background and the data representing a foreground picture, the foreground picture being to be used together with the data representing a desired background picture (in a montage manner), as described above.

Figure 8B:
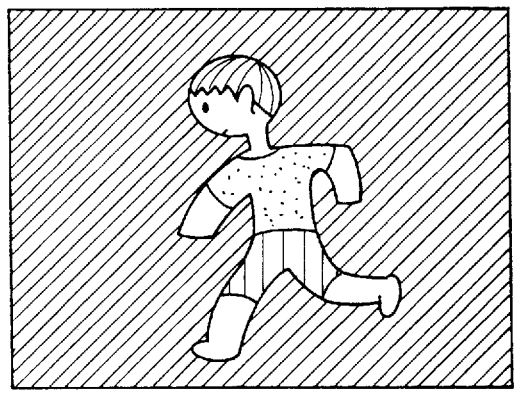

The A/D converter 115 separates RGB components from the moving picture video signal and quantizes the signal so as to obtain the 5-bit digital signal. As a result, picture data is obtained in which each pixel is represented by 15 bits. The picture data is supplied to a chromakey detector 116. Similar to the chromakey detector 47 of FIG. 2, the chromakey detector 116 compares the picture data, for each pixel of the picture represented by the picture data, with the temporary background color code (indicating the blue being the color of the temporary background 30 shown in FIG. 8A). The chromakey detector 116 generates a priority bit, acting as identification data, for each pixel, which bit is '0' if the result of the comparison is that the pixel of the moving picture data corresponds to the temporary background color code and which bit is '1' if the result of the comparison is that the moving picture data does not correspond to the temporary background color code. Further, the chromakey detector 116 replaces the RGB data of the picture data with the RGB data such that each color level is '0', that is, each color is at the lowest brightness level, for a pixel, if the result of the comparison is that the moving picture data corresponds to the temporary background color code for the pixel. The detector 116 passes the supplied picture data therethrough for a pixel if the result of the above comparison is that the moving picture data does not correspond to the temporary background color code. Making the color levels represented by image data be the lowest level improves the data compression rate of the image data. Instead of using the data corresponding to the lowest brightness level to replace the RGB data of the picture data as described above, it is also possible to use the data corresponding to the color of the region immediately inside the contour (such a region immediately inside the contour being referred to as a contour-inside, hereinafter) of the foreground picture represented by the picture data being passed through the chromakey detector 116 appropriately. If the contour-inside color data is used in the above replacement, the contour-inside color of the foreground picture can be prevented from undesirably spreading when the picture data is expanded in an expanding system as will be described later. The picture data processed by the chromakey detector 116 as described above is illustrated in FIG. 8B for the original picture shown in FIG. 8A. Thus, the foreground picture 31, as it has been, is used. The color of the background 30 is replaced by black (or the contour-inside color) indicated by hatching in the figure.

Figure 8C:
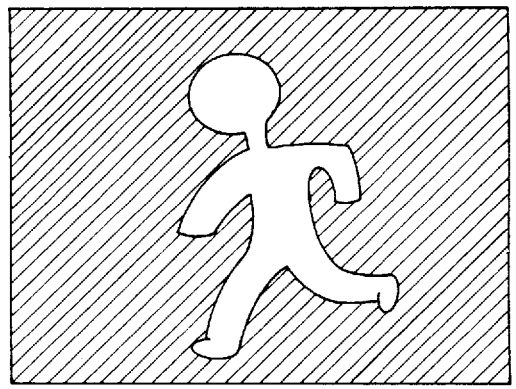

The picture data output from the chromakey detector 116 is supplied to a moving picture compressor 118, which is a MPEG encoder, for example, and with high efficiency compresses the supplied picture data for each 0.5-second displaying time period, for example. The thus compressed data is supplied to a data integrator 119. The priority bits generated by the chromakey detector 116 as described above are illustrated in FIG. 8C. This figure is identical to FIG. 3B as the priority bits are identical to those used in the system in the first embodiment since the original picture shown in FIG. 8A is identical to that shown in FIG. 3A. The priority bits are supplied to a restorable compressor (lossless compressor) 120 which compresses the priority bits so that the thus compressed priority bits can be completely restored (, that is, accurately returned to the state in which the data has not been compressed yet) in the expansion system. In the compressing, run-length coding technology or Huffman coding technology is used so as to code the priority bits (priority data) being a binary-bit series which may have an uneven data distribution, so that the coded data should be completely restored in the expansion system. The thus compressed data is supplied to the data integrator 119.

Figure 9:
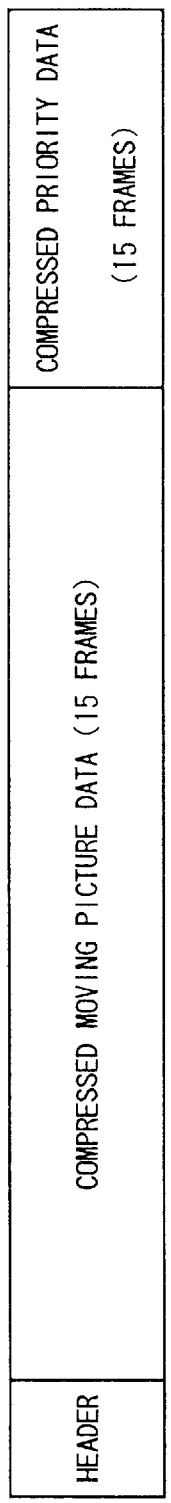
FIG. 9 shows a transfer data format used in the above systems in the second embodiment.

The data integrator 119 integrates the compressed moving picture data supplied by the moving picture compressor 118, the compressed priority data supplied by the restorable compressor 120 and a header, so as to produce integrated data having a formation as shown in FIG. 9, for example. In the example of FIG. 9, each of the compressed moving picture data and the compressed priority data to be integrated together is 15 frames of data as shown in the figure. The 15 frames of data corresponds to a 0.5-second picture displaying time period. The thus obtained integrated data is supplied to a storage device 122 such as a CD-ROM, a hard disc device or the like, so as to be stored in the relevant recording medium. The above integrated data supplied by the data integrator 119 is also supplied to a transmitter 124 simultaneously. The transmitter 124 sends the relevant data via a communication line 126.

Figure 7:
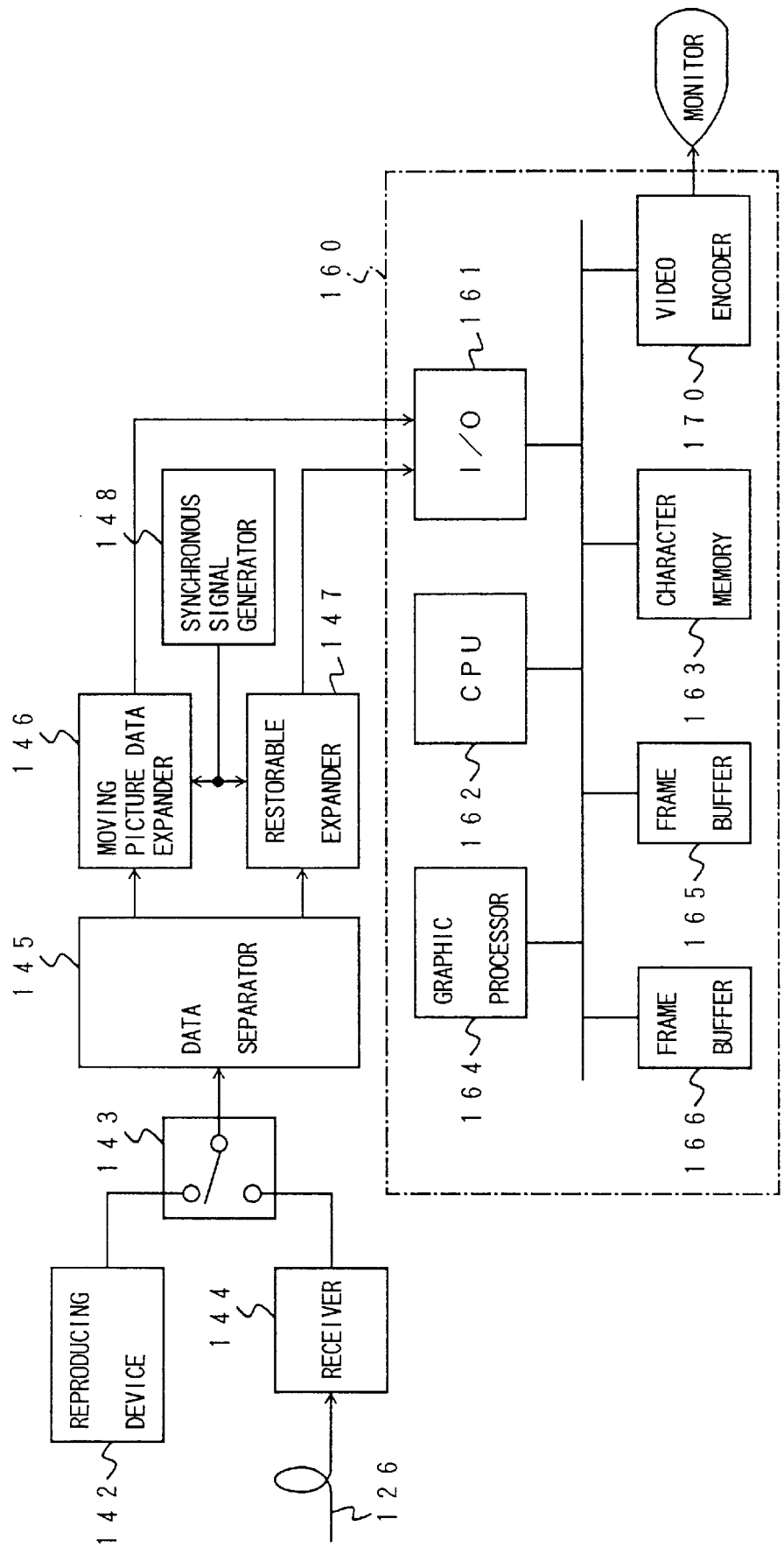
FIG. 7 shows a block diagram of an expansion system in the second embodiment of a picture data processing system according to the present invention.

An expansion system in the second embodiment of the picture processing system according to the present invention will now be described with reference to FIG. 7. A reproducing device 142 reproduces the integrated data, from the recording medium, which data has been stored in the recording medium in the storage device 122. A receiver 144 receives the integrated data transmitted via the communication line 126. A switch 143 selects a desired one of the integrated data supplied by the reproducing device 142 and receiver 144. The thus selected data is supplied to a data separator 145 which separates the supplied integrated data, having the formation shown in FIG. 9, into the compressed moving picture data, compressed priority data and the header. The thus obtained compressed moving picture data is supplied to a moving picture expander 146 which is a MPEG decoder. The compressed priority data is supplied to a restorable expander (lossless expander) 147.

The above moving picture expander 146 expands the supplied compressed moving picture data and outputs the picture data with synchronization with each of vertical synchronous signals, horizontal synchronous signals and pixel clocks, each being supplied by a synchronous signal generator 148. The restorable expander 147 expands the supplied priority data, which has been compressed through the run-length coding technology or Huffman coding technology as mentioned above, into the priority data accurately identical to the relevant original priority data (which is the priority data in the state in which the data has not been compressed yet). The expander 147 outputs the thus restored priority data with synchronization with each of the vertical synchronous signals, horizontal synchronous signals and pixel clocks.

The above picture data and the priority data output from the expanders 146 and 147 are supplied to a character memory 163 via an input/output unit (I/O) 161. The thus supplied picture data and priority bits are written in an address of the memory 163 for each pixel, which address has been specified by a CPU 162. The picture data thus written in the memory 163 for each pixel has a 16-bit formation such as that shown in FIG. 5. The information represented by the respective 16 bits corresponds to that described above with reference to FIG. 5.

A graphic processor 164, similarly to the processor 64 shown in FIG. 2, reads out the above picture data stored in the character memory 163 and performs an arbitrary picture manipulation process on the picture data. The picture manipulation process is a process such as a picture magnification, manipulation, rotation, color operation and so forth. The processor 164 writes the thus processed picture data, combined with the priority bits, in a frame buffer 165. Further, the graphic processor 164 reads the image data and the combined priority bits from the frame buffer 165 and simultaneously, reads data representing a desired background picture from another frame buffer 166. In the reading of the data from the two frame buffers 165 and 166, the processor 164 establishes the vertical and horizontal synchronization between the data reading from the two frame buffers. The data representing the desired background picture(s) was previously stored in the frame buffer 166. The desired background picture data consists of RGB data and does not include priority data such as that mentioned above.

The graphic processor 164 checks the priority bits, combined with the picture data as shown in FIG. 5 and read from the frame buffer 165. The processor 164 selects, for each pixel, the picture data read from the frame buffer 165 if the corresponding priority bit is at '1'. The processor 164 selects the picture data (representing the desired background picture) read from the frame buffer 166 if the priority bit is at '0'. Thus, in the example of FIG. 8A, 8B and 8C, the picture data corresponding to the data supplied from either the reproducing device 142 or the receiver 144 is selected for the pixels corresponding to the foreground 31 and the desired background picture data previously stored in the frame buffer 166 is selected for the pixels corresponding to the temporary background 30. As a result, the currently supplied picture data corresponding to the temporary background 30 is replaced by the area, relevant to the area other than the area occupied by the foreground picture 31, of the desired background picture. The currently supplied picture data corresponding to the foreground 31, as it is, is used. Thus, the foreground picture 31 represented by the currently supplied picture data is properly superimposed on the desired background picture represented by the data previously stored in the frame memory 166.

The graphic processor 164 supplies the picture data selected by the graphic processor 164 as described above to a video encoder 170 which generates the video signal representing the picture in which the foreground picture 31 is superimposed on the desired background picture. The monitor 172 displays the relevant picture using the video signal.

In general, a moving picture compression/expansion method such as MPEG may cause a discrepancy between a first picture before being compressed and a second picture obtained as a result of compressing and then expanding the first picture data. In particular, a color at the contour-inside of a foreground may undesirably spread in the course of the above compression/expansion process. However, there occurs no discrepancy between a first priority data before being compressed and a second priority data obtained as a result of compressing and then expanding the first priority data through the restorable (lossless) compression/expansion method such as the run-length coding or Huffman coding technology. Thus, even if such undesirable color spreading occurs in the foreground contour-inside of the second picture, that is, even if the contour-inside color of the foreground 31 becomes to be present outside the area in which the foreground 31 has been originally present in the example of FIG. 8A, 8B and 8C, the thus outside spreading contour-inside color is replaced by the desired background picture, previously stored in the frame buffer 166, properly due to the use of the precisely restored priority data. As a result, the contour-inside color spreading outside the original foreground area is canceled so that undesirable effect of the color spreading becomes negligible. Further, previously replacing the contour-inside color of the foreground 31 with the color of the temporary background 30 as mentioned above further reduces undesirable effect of such color spreading as mentioned above.

Thus, the compression system transmits the compressed moving picture data, obtained as a result of compressing the color data and the compressed priority data obtained as a result of compressing the priority data, in the state in which the above two sorts of compressed data have been integrated. The expansion system separates the thus integrated two sorts of data. Thus, it is possible to compress/expand the moving picture data and the priority data since the two sorts of data are separately compressed/expanded. The expansion system uses the priority data, combined with the relevant moving picture data, which priority data enables the foreground picture represented by the expanded picture data to be appropriately superimposed on another picture such as the previously stored desired background picture.

In the expansion system in the second embodiment, similarly to the system in the first system, it is possible to superimpose a plurality of moving pictures on one another as follows. After a moving picture is formed in the frame buffer 165, another moving picture is superimposed on the first moving picture.

Thus, the picture processing system according to the present invention has practically effective functions of displaying a moving picture in which a foreground picture, obtained as a result of expanding a once compressed moving picture data, is superimposed on another picture, since it is possible to compress/expand the moving picture data combined with the corresponding priority data.

Further, the present invention is not limited to the above described embodiments, and variations and modifications may be made without departing from the scope of the present invention.

What is claimed is:

1. A picture data processing system comprising:
    lossy compression means for compressing picture data, said picture data having different color component values and wherein the picture data comprises color data;
    lossless identification data compressing means for compressing identification data of the picture data, said identification data indicating whether each pixel represented by said picture data is a pixel of a foreground or a pixel of a predetermined background; and
    integrating means for integrating the compressed picture data compressed by said picture data compressing means with the compressed identification data compressed by said identification data compressing means.

2. The picture data processing system according to claim 1, wherein said identification data comprises priority data.

3. The picture data processing system according to claim 1, wherein the picture data comprises moving picture data in which the foreground moves in front of the background.

4. The picture data processing system according to claim 1, further comprising identification data generating means for comparing, for each pixel, the color data of the picture data with the color data of the predetermined background so as to generate the identification data.

5. A picture data processing system comprising lossy picture data compressing means for compressing picture data, said picture data having different color component values wherein the picture data comprises color data;
    lossless identification data compressing means for compressing identification data of the picture data, said identification data indicating whether each pixel represented by said picture data is a pixel of a foreground or a pixel of a predetermined background;
    integrating means for integrating the compressed picture data compressed by said picture data compressing means with the compressed identification data compressed by said identification data compressing means;
    said system further comprising identification data generating means for comparing, for each pixel, the color data of the picture data with the color data of the predetermined background so as to generate the identification data; and wherein said identification data generating means changes the color data of the picture data into the lowest component value of color data for a pixel if the picture data for said pixel corresponds to the predetermined background.

6. A picture data processing system comprising lossy picture data compressing means for compressing picture data, said picture data having different color component values, wherein the picture data comprises color data;
    lossless identification data compressing means for compressing identification data of the picture data, said identification data indicating whether each pixel represented by said picture data is a pixel of a foreground or a pixel of a predetermined background;
    integrating means for integrating the compressed picture data compressed by said picture data compressing means with the compressed identification data compressed by said identification data compressing means;
    said system further comprising identification data generating means for comparing, for each pixel, the color data of the picture data with the color data of the predetermined background so as to generate the identification data; and wherein said identification data generating means changes the color data of the picture data for a pixel into the color data representing the color of a contour-inside of the foreground if the picture data for said pixel corresponds to the predetermined background.

7. A picture data processing system comprising lossy picture data compressing means for compressing picture data, said picture data having different color component values, wherein the picture data comprises color data;
    lossless identification data compressing means for compressing identification data of the picture data, said identification data indicating whether each pixel represented by said picture data is a pixel of a foreground or a pixel of a predetermined background;
    integrating means for integrating the compressed picture data compressed by said picture data compressing means with the compressed identification data compressed by said identification data compressing means;
    said system further comprising identification data generating means for comparing, for each pixel, the color data of the picture data with the color data of the predetermined background so as to generate the identification data, and wherein said identification data generating means comprises chromakey detecting means.

8. The picture data processing system according to claim 1, wherein said picture compressing means comprises a moving picture image coding expert group (MPEG) encoder.

9. The picture data processing system according to claim 1, wherein said identification data compressing means has a function of coding the supplied picture data so that the thus coded data can be completely restored.

10. The picture data processing system according to claim 1, wherein said identification data compressing means comprises a run-length coding encoder.

11. The picture data processing system according to claim 1, wherein said identification data compressing means comprises a Huffman coding encoder.

12. The picture data processing system according to claim 1, wherein said integrating means integrates the compressed picture data and the compressed identification data for each 15 frames of the two sorts of data, each 15 frames of data corresponding to 0.5-second picture displaying time period.

13. A picture data processing system comprising:
lossy expanding means for expanding picture data, said picture data having different color component values, comprises color data and is combined with identification data to form integrated data;
lossless identification data expanding means for expanding identification data which indicates whether each pixel represented by said picture data is a pixel of a foreground or a pixel of a predetermined background; and
separating mans for separating said integrated data into the picture data and the identification data so as to supply both sets of data to said picture data expanding means and said identification data expanding means appropriately.

14. The picture data processing system according to claim 13, wherein said identification data comprises priority data.

15. The picture data processing system according to claim 13, wherein the picture data comprises moving picture data in which the foreground moves in front of the predetermined background.

16. The picture data processing system according to claim 13, further comprising data selecting means for selecting an appropriate one of the pixel of said foreground represented by said picture data and a pixel of another desired background, the selecting being carried out so that the pixel of said foreground is selected if the corresponding identification data indicates the foreground and the pixel of said desired background is selected if the corresponding identification data indicates said predetermined background.

17. The picture data processing system according to claim 13, wherein said picture expanding means comprises a moving picture expert image coding group (MPEG) decoder.

18. The picture data processing system according to claim 13, wherein said identification data expanding means has a function of decoding the supplied picture data so that the previously coded data can be completely restored.

19. The picture data processing system according to claim 13, wherein said identification data expanding means comprises a run-length coding decoder.

20. The picture data processing system according to claim 13, wherein said identification data expanding means comprises a Huffman coding decoder.

21. The picture data processing system according to claim 13, further comprising synchronizing means for synchronizing both sets of data expanded by said picture data expanding means and said identification data expanding means together.

22. A picture data processing system comprising:
lossy compression means for compressing picture data, said picture data having different color component values, wherein the picture data comprises color data;
lossless identification data compressing means for compressing identification data of the picture data, said identification data indicating whether each pixel represented by said picture data is a pixel of a foreground or a pixel of a predetermined background;
integrating means for integrating the compressed picture data compressed by said picture data compressing means with the compressed identification data compressed by said identification data compressing means;
separating mans for separating the integrated data, integrated by said integrating means, into the compressed picture data and the compressed identification data;
lossy picture data expanding means for expanding the compressed picture data so as to obtain the color data of the relevant picture data; and
lossless identification data expanding means for expanding the compressed identification data so as to obtain the identification data.

23. The picture data processing system according to claim 22, wherein said identification data comprises priority data.

24. The picture data processing system according to claim 22, further comprising data selecting means for selecting an appropriate one of the pixel of said foreground represented by said picture data and a pixel of another desired background, the selecting being carried out so that the pixel of said foreground is selected if the corresponding identification data indicates the foreground and the pixel of said desired background is selected if the corresponding identification data indicates the pixel of a pixel of said predetermined background.

* * * * *